3,285,883
CURED POLYMERS OF ALPHA-OLEFINS AND
THEIR PREPARATION
Thomas H. Shepherd, Hopewell, N.J., assignor, by mesne assignments, to Mobil Oil Corporation, a corporation of New York
No Drawing. Filed Sept. 23, 1963, Ser. No. 310,903
25 Claims. (Cl. 260—79.5)

This invention relates to a method for curing (i.e., cross-linking) normally solid polymers and copolymers of α-olefins and to the cured products obtained thereby. More particularly, this invention relates to a novel method for curing normally solid polypropylene and the cured product thereof.

In accordance with this invention, a normally solid polymer or copolymer of an alpha-olefin is cured by heating, at an elevated temperature, a composition comprising the polymer to be cured in mixture with a small amount, based on the weight of the polymer, of a tetrahaloquinone or of sulfur and a tetrahaloquinone as the curing agent. In more specific embodiment, the invention is carried out by heating a mixture comprising 100 parts by weight of a polymer or copolymer to be cured, from about 0.5 to about 5 parts by weight of a tetrahaloquinone and from 0 to about 2.5 parts by weight of sulfur, the sulfur being in an amount from zero up to about one half the weight of the curing agent.

Still more specifically, and although the amount of the tetrahaloquinone curing agent that is used will depend on the particular tetrahaloquinone and polymer or copolymer to be cured, a more preferred mixture to be cured contains from about 1 to about 4 parts by weight of the curing agent per 100 parts by weight of the polymer or copolymer. The proportion of sulfur in the mixture will also depend on the particular curing agent and polymer or copolymer employed with the preferred proportion generally being less than half the weight of that of the curing agent and, generally, from about 0.5 to about 2 parts by weight per 100 parts by weight of the polymer or copolymer, although the present invention is operable with no sulfur in the curing compound.

In a particular embodiment of the present invention, the polymer or copolymer to be cured is ground and slurried with the curing agent and sulfur, if desired, in an organic liquid, suitable examples of which include acetone, diethyl ether, and others, with the compounding being accomplished by evaporating the solvent. Thereafter the composite is dried at about 200–250° F. The polymeric composition can then be cured by heating at an elevated temperature, as for example, from about 275 to about 425° F., and more specifically, from about 325 to about 375° F. for a length of time sufficient to allow adequate curing, usually for at least about 3 minutes and, generally, from about 5 to about 60 minutes.

The above-described method is suitable for a small-scale application of the method of the present invention. The present method, however, may be applied similarly in a larger scale. In such an application the compounding is achieved on conventional roller mills or in internal mixers such as a Banbury, Koneader or screw extruders, particularly the twin screw extruder, and the like. In all cases the final temperature of the batch should be as low as practicable, preferably exceeding only slightly the melting point of the polymer. Although maximum temperatures of the order of about 425–450° F. are encountered in the mixing cycle, preferably the mixer employed discharges the compound at a temperature considerably lower. Significantly, many of the above internal mixers are particularly effective in dispersing the compounding ingredients. Consequently, in such a process, the mixing time would be frequently shortened to about 3–5 minutes and would rarely exceed 5–10 minutes.

The present invention is especially applicable to the curing of polypropylene and, hence, the invention is described herein with particular emphasis on polypropylene. However, it is also applicable to the curing of other polymers or copolymers of alpha-olefins, for example, polymers or copolymers obtained from one, two or more of the following olefins: ethylene, propylene, 1-butene, 1-pentene, 4-methyl-1-pentene, 5-methyl-1-hexene, 4-ethyl-1-pentene, and, in general, other alpha-olefins containing up to 10 carbon atoms. In reference to copolymers, it is preferred that one of the olefins from which the copolymer is obtained be ethylene or propylene. Additionally, the invention is applicable to the curing of a broad spectrum of copolymer compositions including terpolymers and higher combinations. In commercial practice with polymers of particularly beneficial utility, the copolymers most frequently comprise ethylene, propylene, 1-butene or combinations thereof. With more difficulty, the invention is also applicable to the curing of a copolymer of one of the above-mentioned alpha-olefins and another olefin having a double bond which is not in the alpha position. Examples of such other olefins include the following: 2-butene, 2-pentene, 2-hexene, 3-hexene, and others.

The tetrahaloquinones useful for practice of the present invention have the following formula:

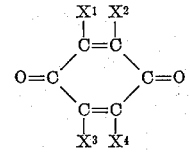

wherein $X^1$, $X^2$, $X^3$ and $X^4$ are halogen atoms, examples of which include: chlorine, bromine, iodine or mixtures thereof, and preferably, chlorine. Specific examples of useful tetrahaloquinones are chloranil (tetrachloroquinone), tetrabromoquinone, trichlorobromoquinone, and others.

By the method of the present invention, polymers or copolymers of alpha-olefins can be cured to give products having a high tensile strength, e.g., from about 4000–5500 p.s.i. at yield, an elongation at break of about 3.5–100% or more, while exhibiting excellent chemical inertness.

The following examples set forth embodiments of the invention for purposes of illustration and not limitation.

*Example*

(A) In this example polypropylene, chloranil (CL) and sulfur were combined according to the following formulas (all parts being by weight):

|               | A   | B   |
|---------------|-----|-----|
| Polypropylene | 100 | 100 |
| CL            | 4   | 1   |
| Sulfur        | 0   | 0.5 |

Slabs of the composition of Formula A were cured at various curing temperatures. The physical properties of the various products were evaluated and the results are given below:

|  | A-1 | A-2 | A-3 | A-4 | A-5 | A-6 | A-7 | A-8 |
|---|---|---|---|---|---|---|---|---|
| Curing temperature, °F | 325 | 330 | 335 | 340 | 350 | 360 | 370 | 335 |
| Curing time, minutes at yield | 30 | 30 | 30 | 30 | 30 | 30 | 30 | 60 |
| Tensile strength at yield, p.s.i | 4500 | 5100 | 4970 | 5250 | 3970 | 3520 | 3370 | 5040 |
| Tensile modulus, p.s.i | 200,000 | 209,000 | 211,000 | 266,000 | 228,000 | 235,000 | 202,000 | 240,000 |
| Elongation, percent | 7 | 10 | 70 | 10 | 3.5 | 4 | 4.5 | 6.5 |
| Gel, percent | 40 | 52 | 55 | 66 | 50 | 55 | 48 | 70 |

Tensile strength, tensile modulus and elongation values are averages of duplicate determinations made on "Die C" specimens with a model TM Instron at a cross-head speed of 0.2 inch/min. Tensile testing was carried out according to ASTM D-638-58T. Gel values are single determinations of the weight percent of cured polymer remaining after extraction for 24 hours with boiling tetrachloroethylene in a Soxhlet extractor.

(B) Slabs of the composition of Formula B were cured for 30 minutes at various temperatures. The physical properties of the various products were evaluated and the results are given below:

|  | B-1 | B-2 | B-3 |
|---|---|---|---|
| Curing temperature, °F | 330 | 340 | 350 |
| Tensile strength at yield, p.s.i | 5470 | 4800 | 4600 |
| Tensile modulus, p.s.i | 246,000 | 192,000 | 173,000 |
| Elongation, percent | 11 | >100 | >100 |
| Gel, percent | 53 | 48 | 25 |

The above results clearly illustrate that a polymer of an alpha olefin, exemplified by propylene, compounded with a tetrahaloquinone or with a tetrahaloquinone and sulfur can be effectively cured to give a cross-linked product which exhibits superior strength, ductility and chemical inertness.

Although the present invention has been described with preferred embodiments, it is to be understood that modifications and variations may be resorted to, without departing from the spirit and scope of this invention, as those skilled in the art will readily understand. Such variations and modifications are considered to be within the purview and scope of the appended claims.

What is claimed is:

1. A method for curing normally solid polymers of an alpha-olefin which comprises heating a normally solid polymer of an alpha-olefin, blended with a small amount, based on the weight of said polymer, of a tetrahaloquinone as a curing agent, at a temperature above the melting point of said blend, for a period of time sufficient to cross-link said polymer.

2. A method for curing normally solid polymers of an alpha-olefin which comprises heating a normally solid polymer of an alpha-olefin, blended with a small amount, based on the weight of said polymer, of a tetrahaloquinone as a curing agent, and sulfur in an amount by weight less than that of said curing agent, at a temperature above the melting point of said blend, for a period of time sufficient to cross-link said polymer.

3. A method as defined in claim 1 in which the blend by weight contains 0.005 to about 0.05 part of the tetrahaloquinone per part of the polymer.

4. A method as defined in claim 1 in which the blend by weight contains 0.005 to about 0.05 part of the tetrahaloquinone and sulfur in an amount up to about ½ the weight of the tetrahaloquinone.

5. A method as defined in claim 1 wherein the blend is heated at a temperature of from about 275° F. to about 425° F. for at least 3 minutes.

6. A method as defined in claim 2 wherein the blend is heated at a temperature of from about 275° F. to about 425° F. for at least 3 minutes.

7. A method as defined in claim 1 wherein the blend by weight contains 0.005 to about 0.05 part of the tetrahaloquinone per part of the polymer, and wherein the blend is heated at a temperature of from about 275° F. to about 425° F. for at least 3 minutes.

8. A method as defined in claim 1 wherein the normally solid polymer is polypropylene.

9. A method as defined in claim 2 wherein the normally solid polymer is polypropylene.

10. A method as defined in claim 1 wherein the normally solid polymer is a copolymer of two or more different alpha-olefins.

11. A method as defined in claim 1 wherein the normally solid polymer is a copolymer of an alpha-olefin and an olefin unsaturated other than in the alpha position.

12. A method as defined in claim 1 wherein the tetrahaloquinone has the following structure:

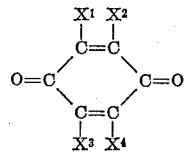

in which $X^1$, $X^2$, $X^3$ and $X^4$ are halogen atoms.

13. A method as defined in claim 1 wherein the tetrahaloquinone curing agent is chloranil.

14. A method as defined in claim 2 wherein the tetrahaloquinone curing agent is chloranil.

15. A composition, useful in the preparation of cured polymers of alpha-olefins, comprising a normally solid polymer of an alpha-olefin, blended with a small amount, based on the weight of said polymer, of a tetrahaloquinone as a curing agent.

16. A composition, useful in the preparation of cured polymers of alpha-olefins, comprising a normally solid polymer of an alpha-olefin, blended with a small amount, based on the weight of said polymer, of a tetrahaloquinone as a curing agent, and sulfur in an amount less than that of said curing agent.

17. A composition, useful in the preparation of cured polymers of alpha-olefins comprising a blend as defined in claim 15 which contains by weight from about 0.005 to about 0.05 part of said tetrahaloquinone per part of said polymer.

18. A composition, useful in the preparation of cured polymers of alpha-olefins comprising a blend as defined in claim 16 which contains by weight from about 0.005 to about 0.05 part of said tetrahaloquinone per part of said polymer and sulfur in an amount up to about ½ the weight of said tetrahaloquinone.

19. A composition, useful in the preparation of cured polymers of alpha-olefins, comprising a blend as defined in claim 17 wherein the normally solid polymer is polypropylene.

20. A composition, useful in the preparation of cured polymers of alpha-olefins, comprising a blend as defined in claim 16 wherein the normally solid polymer is polypropylene.

21. A composition, useful in the preparation of cured polymers of alpha-olefins, comprising a blend as defined in claim 15 wherein the normally solid polymer is a copolymer of two or more different alpha-olefins.

22. A composition, useful in the preparation of cured polymers of alpha-olefins, comprising a blend as defined in claim 15 wherein the normally solid polymer is a copolymer of an alpha-olefin and an olefin unsaturated other than in the alpha position.

23. A composition, useful in the preparation of cured polymers of alpha-olefins, comprising a blend as defined in claim 15 wherein the tetrahaloquinone has the following structure:

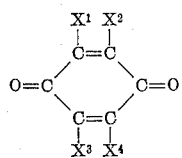

in which $X^1$, $X^2$, $X^3$ and $X^4$ are halogen atoms.

24. A composition, useful in the preparation of cured polymers of alpha-olefins, comprising a blend as defined in claim 15 wherein the tetrahaloquinone curing agent in chloranil.

25. A composition, useful in the preparation of cured polymers of alpha-olefins, comprising a blend as defined in claim 16 wherein the tetrahaloquinone curing agent is chloranil.

References Cited by the Examiner
UNITED STATES PATENTS

| | | | |
|---|---|---|---|
| 2,890,187 | 6/1959 | Bowman et al. | 260—79.5 |
| 2,920,062 | 1/1960 | McFarland | 260—79.5 |
| 2,983,714 | 5/1961 | Robinson et al. | 260—79.5 |
| 3,047,552 | 7/1962 | Reynolds et al. | 260—94.9 |

JOSEPH L. SCHOFER, *Primary Examiner.*

L. EDELMAN, *Assistant Examiner.*